(12) United States Patent
Dellow et al.

(10) Patent No.: US 7,836,300 B2
(45) Date of Patent: Nov. 16, 2010

(54) SECURITY INTEGRATED CIRCUIT

(75) Inventors: Andrew Dellow, Glos (GB); Rodrigo Cordero, Bristol (GB)

(73) Assignee: STMicroelectronics Limited, Bristol (GB)

( * ) Notice: Subject to any disclaimer, the term of this patent is extended or adjusted under 35 U.S.C. 154(b) by 940 days.

(21) Appl. No.: 10/705,782

(22) Filed: Nov. 10, 2003

(65) Prior Publication Data
US 2004/0156507 A1 Aug. 12, 2004

(30) Foreign Application Priority Data
Nov. 11, 2002 (EP) .................................. 02257789

(51) Int. Cl.
H04L 29/06 (2006.01)
H04L 9/00 (2006.01)
H04L 9/08 (2006.01)
H04N 7/167 (2006.01)

(52) U.S. Cl. ........................ 713/163; 380/200; 380/232; 380/277

(58) Field of Classification Search ................. 713/163; 380/200, 232, 277–279; 725/25, 31
See application file for complete search history.

(56) References Cited

U.S. PATENT DOCUMENTS

| | | | | |
|---|---|---|---|---|
| 4,887,296 | A * | 12/1989 | Horne | 380/239 |
| 5,852,290 | A * | 12/1998 | Chaney | 235/492 |
| 5,991,400 | A * | 11/1999 | Kamperman | 380/239 |
| 5,999,629 | A * | 12/1999 | Heer et al. | 705/51 |
| 6,311,204 | B1 * | 10/2001 | Mills | 718/100 |
| 6,539,478 | B1 * | 3/2003 | Furuya et al. | 713/150 |
| 6,577,734 | B1 * | 6/2003 | Etzel et al. | 380/277 |
| 6,622,303 | B1 * | 9/2003 | Yamashita | 725/66 |
| 6,625,147 | B1 * | 9/2003 | Yokoyama et al. | 370/389 |

(Continued)

FOREIGN PATENT DOCUMENTS

EP 0428252 A2 5/1991

(Continued)

OTHER PUBLICATIONS

Giachetti, J-L. et al., "A Common Conditional Access Interface for Digital Video Broadcasting Decoders," *IEEE Transactions on Consumer Electronics* 41(3):836-841, Aug. 1995.

(Continued)

*Primary Examiner*—Kimyen Vu
*Assistant Examiner*—Suman Debnath
(74) *Attorney, Agent, or Firm*—Lisa K. Jorgenson; E. Russell Tarleton; Seed IP Law Group PLLC

(57) ABSTRACT

A semiconductor integrated circuit for the processing of conditional access television signals, the circuit including an input interface for receiving encrypted television signals and an output interface for output of decrypted television signals. Control signals broadcast with the television signals include control words and common keys. The common keys are received in encrypted form, encrypted according to a secret key unique to each semiconductor integrated circuit. The input interface is connected to a decryption circuit whereby the only manner of providing the common keys to the circuit are in encrypted form encrypted according to the secret key. Due to the monolithic nature of the circuit, no secrets are exposed and the system is secure.

20 Claims, 2 Drawing Sheets

U.S. PATENT DOCUMENTS

| | | | |
|---|---|---|---|
| 6,728,379 B1 * | 4/2004 | Ishibashi et al. | 380/278 |
| 7,120,604 B2 * | 10/2006 | Maari | 705/51 |
| 7,151,831 B2 * | 12/2006 | Candelore et al. | 380/200 |
| 7,165,180 B1 * | 1/2007 | Ducharme | 713/182 |
| 2004/0107344 A1 * | 6/2004 | Minemura et al. | 713/171 |

FOREIGN PATENT DOCUMENTS

| | | |
|---|---|---|
| EP | 0866615 A2 | 9/1998 |
| EP | 1163798 B1 | 12/2001 |
| WO | WO86/07224 A1 | 12/1986 |
| WO | WO99/41874 A1 | 8/1999 |
| WO | WO01/15448 A1 | 3/2001 |

OTHER PUBLICATIONS

Menezes, A. et al., *Handbook of Applied Cryptography*, CRC Press, Boca Raton, 1997, Chapter 13.3, "Techniques for Distributing Confidential Keys," pp. 551-553.

* cited by examiner

SECURITY INTEGRATED CIRCUIT

BACKGROUND OF THE INVENTION

1. Field of the Invention

The present invention relates to an integrated circuit for processing received transmitted signals, in particular broadcast signals such as television.

2. Description of the Related Art

A wide variety of techniques for broadcast transmission are known in which the broadcast signal is encoded, scrambled or encrypted in some way to allow only authorized recipients to retrieve the original signal. One particular field in which this area has been researched is broadcast television.

The broadcast of television signals in which only permitted or authorized recipients can produce the clear television picture from those signals is known as Conditional Access Television or Pay-TV. In this context, broadcast can include over-air, via satellite, by cable or indeed any appropriate distribution medium in which the same signal content is sent to many recipients. Television signals may be analogue signals or digital signals. The term "scrambling" is often used for the process of rendering analogue signals unusable until "descrambled", whereas the terms "encryption" and "decryption" are more often used for digital signals. In either case, the aim is to only allow users that have paid a subscription to descramble/decrypt the signals.

A known system and receiver for processing received signals is described in EP 0,428,252 which is illustrated in FIG. 1. The concept in this system is to broadcast signals in the air (by satellite) that can be received by anyone, but only rendered usable by recipients having a "set top box" decoder 2 and an associated smart card 22. The decoders 2 of all recipients are identical, but the smart cards 22 contain unique secrets, including entitlements, which specify which channels within the broadcast signals the user is permitted to watch. The system operates broadly as follows:

A television signal is broadcast over air in a scrambled form and includes a stream of control data describing how the television signal is to be descrambled. The television signals and control data are necessarily the same signal sent to all users. It is not feasible to send the signals uniquely scrambled/encrypted to each recipient as there may be tens of millions of users and this would require tens of millions of times the bandwidth. Accordingly, all recipients must be able to operate the same descrambling/decryption process. This is implemented in the decoder 2, which receives the broadcast signals from a receiver 12. A data demodulator 14 extracts the portion of the signal for picture and/or sound and provides this to a descrambler 16 for descrambling. The control data portion is extracted and provided to a verifier 20 over line 15. The control data comprises encrypted control words that are needed to instruct the descrambler how to descramble the picture/sound signal. The control words must therefore be decrypted, and it is for this purpose that the smart card 22 is provided.

The verifier 20 provides encrypted control words across an interface along line 21 to the smart card 22. The smart card 22 contains an algorithm that, if the user is entitled to watch the chosen channel, decrypts the control words and provides them to the verifier 20 via line 23. The verifier passes the decrypted control words to a PRBS 18, which in turn provides a descrambling code to the descrambler. It should be noted that the control words and hence the descrambling code change frequently (every few seconds). The security in this arrangement makes it infeasible to try and decrypt the control words in real time without the smart card algorithm. Also, in the event the smart card algorithm is compromised, then the smart cards themselves can be re-issued to all subscribers. Lastly, to view any channels, a user must pay for "entitlements" that are broadcast over air and addressed uniquely to each user and stored in the smart card 22.

A second published system is disclosed in a paper "Security and Addressability for Pay-TV" given at The Video Revolution Conference July 1982, University of Reading. In this system, it is proposed that a monthly key is broadcast to each subscriber using each subscriber's unique unit key stored in a decoder. In turn the monthly key, which is common to all users of the system, is used to decrypt a program key for decrypting a given television program.

BRIEF SUMMARY OF THE INVENTION

We have appreciated security problems with known conditional access broadcast techniques. In the smart card approach, the decrypted control words are available across an open interface between the smart card and decoder. These can be recorded and provided to other users by another communication channel (such as the Internet) and any recipient is thereby enabled to descramble the broadcast signal.

In accordance with one embodiment of the invention, a semiconductor integrated circuit for decryption of broadcast signals is provided that includes an input interface for receipt of received encrypted broadcast signals and control data and an output interface for output of decrypted broadcast signals; an input interface for receipt of received encrypted broadcast signals and control data, and an output interface for output of decrypted broadcast signals; a processing unit arranged to receive encrypted broadcast signals via the input interface, to decrypt the encrypted broadcast signals in accordance with control signals, and to provide decrypted broadcast signals to the output interface; a first decryption circuit arranged to receive encrypted control signals from the input interface and to decrypt the control signals in accordance with a common key from a common key store; a second decryption circuit arranged to receive the common key in encrypted form from the input interface and to decrypt the common key in accordance with a secret key from a secret key store; whereby the circuit is arranged such that the only route to placing a common key in the common key store is to input the common key in encrypted form for decryption in accordance with the secret key, and the only route to providing the control signals to the processing unit is to input them in encrypted form for decryption in accordance with the common key.

In accordance with another embodiment of the invention, a decryption device is provided that includes a common key store configured to receive a common key in encrypted form; a secret key store configured to store a secret key; a decryption unit comprising a first decryption circuit configured to receive encrypted control signals and to decrypt the control signals in accordance with a common key from the common key store, and a second decryption circuit configured to receive the common key in encrypted form and to decrypt the common key in accordance with a secret key from the secret key store and to store the common key in the common key store; and a processing unit configured to receive encrypted broadcast signals and decrypt the encrypted broadcast signals in accordance with the decrypted control signals received from the decryption unit and to provide decrypted broadcast signals to an output interface.

A method for decryption of broadcast signals is provided, the method includes the steps of receiving encrypted broadcast signals, encrypted control signals, and encrypted common key signals at an input interface of a decryption unit formed on a semiconductor integrated circuit; decrypting the encrypted common key utilizing a stored secret key to generate a common key; decrypting the encrypted control signals with the common key to generate decrypted control signals; and decrypting the encrypted broadcast signals in accordance with the control signals and providing decrypted broadcast signals to an output interface of the decryption device.

In accordance with another embodiment of the invention, a method for broadcasting signals is provided. The method includes encrypting control words and transmitting the encrypted control words; encrypting a common key and transmitting the encrypted common key; encrypting broadcast signals and transmitting the encrypted broadcast signals to the plurality of subscribers; providing a secret key to the authorized recipients that is stored in a decryption unit; receiving encrypted broadcast signals, encrypted control signals, and encrypted common key signals at an input interface of a decryption unit formed on a semiconductor integrated circuit; decrypting the encrypted common key utilizing a stored secret key to generate a common key; decrypting the encrypted control signals with the common key to generate decrypted control signals; and decrypting the encrypted broadcast signals in accordance with the control signals and providing decrypted broadcast signals to an output interface of the decryption device.

In accordance with yet another embodiment of the invention, a system for broadcasting signals to a plurality of subscribers is provided. The system includes a transmitter configured to broadcast signals encrypted according to control words, control words encrypted according to a common key that is common to all authorized recipients, and a common key encrypted according to a secret key that is unique to each authorized recipient; and a plurality of receivers to receive the broadcast signals, each receiver comprising a decryption unit having a secret key unique to the decryption unit stored therein, and each decryption unit further comprising: a common key store configured to receive a common key in encrypted form; a secret key store configured to store a secret key; a decryption unit comprising a first decryption circuit configured to receive encrypted control signals and to decrypt the control signals in accordance with a common key from the common key store, and a second decryption circuit configured to receive the common key in encrypted form and to decrypt the common key in accordance with a secret key from the secret key store and to store the common key in the common key store; and a processing unit configured to receive encrypted broadcast signals and decrypt the encrypted broadcast signals in accordance with the decrypted control signals received from the decryption unit and to provide decrypted broadcast signals to an output interface.

The preferred embodiment of the invention has the advantage that no data is exposed, which could allow the security to be compromised.

BRIEF DESCRIPTION OF THE DRAWINGS

An embodiment of the invention will now be described by way of example only with reference to the figures, in which.

DETAILED DESCRIPTION OF THE INVENTION

Figure 1:
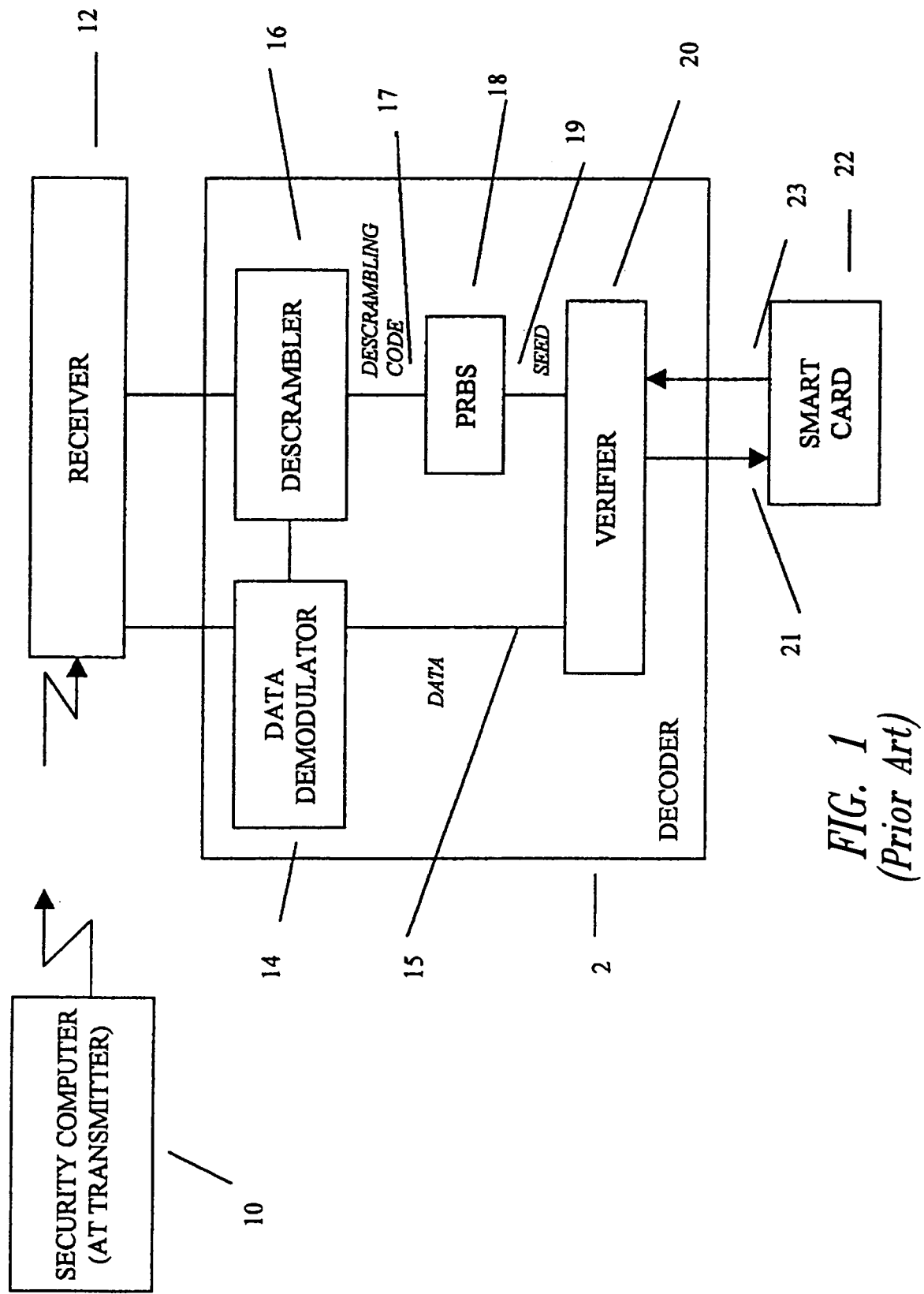
FIG. 1 shows a known receiver and decoder arrangement.
Figure 2:
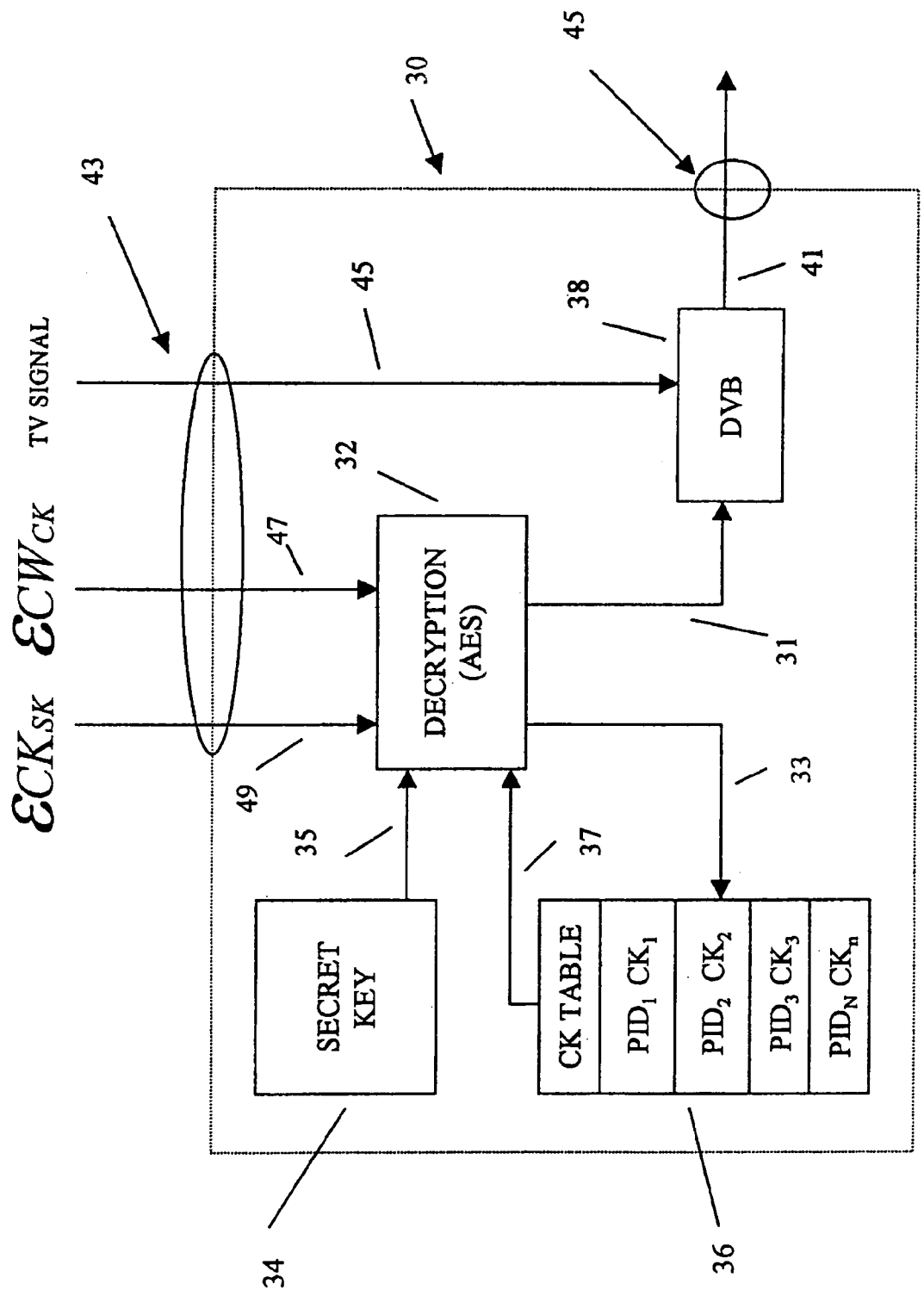
FIG. 2 shows the main functional components of a circuit embodying the invention.

A semiconductor integrated circuit 30 embodying the invention is shown in FIG. 2. In the illustrated embodiment, of importance is that the circuit 30 is a monolithic device in the sense that it is implemented as a single chip with the result that the internal bus connections shown are not available to exterior devices. It is not possible, therefore, for a hacker to compromise the security of the arrangement by simply reading the signals on any of the internal buses. The only external connections are at input interface 43, which receives the broadcast signal and output interface 45 which provides the descrambled/decrypted output signal. The embodiment is primarily applicable to digital broadcast television signals (broadcast by any medium), but is equally applicable to any other digital broadcast signal where security is required.

A digital television signal is received by a receiver, processed according to how the signal was received (e.g., satellite, terrestrial, cable) and is demultiplexed from data signals including a control channel. The resultant digital TV signal remains in encrypted form, and is provided to the circuit 30 at interface 43. The TV signal is necessarily encrypted according to an encryption/decryption scheme common to all authorized recipients. This is because there are likely to be millions of recipients, and to broadcast the TV signal using individual encryption schemes would require broadcasting the signal in millions of different encrypted forms simultaneously, and this is simply not feasible. The encrypted TV signal is provided to a DVB unit 38 on an internal bus line 45, where it is decrypted in accordance with control data to produce a clear TV signal at an output line 41 to output interface 45. The clear TV signal is a digital data stream that can be converted to picture and sound without further secret cryptographic techniques.

A fixed decryption scheme could be used having a key common to all users; however, this would be insecure because once deciphered, the decryption would then be available to all. Accordingly, a changing encryption scheme is used in which an encrypted flow of control words (CW) are broadcast in the control data, which requires decryption to be provided to the DVB Unit 38. The control words are also encrypted in a manner common to all authorized recipients, otherwise a unique flow of control words would need to be individually provided to each of the millions of recipients, which would again be infeasible because of bandwidth. The control words are provided in encrypted form via an input interface 43 and internal bus 47 to a decryption circuit 32, preferably an AES circuit. The AES circuit 32 decrypts the encrypted control words and provides it to the DVB unit 38 via the internal bus 31.

The encryption scheme of the control word data flow is the same for all recipients (otherwise the control word data flow itself would differ for each recipient with the bandwidth problem noted above). A Common Key (CK) for the AES circuit 32 is therefore required. The common key (CK), we have appreciated, could present a weakness in the security of the whole system. If the common key could be found and provided to the circuit 30 then, once deciphered, any user could simply provide the common key to their set top box (in which the circuit 30 is located) and would then have free access.

The circuit 30 is therefore arranged to avoid this weakness. The common key (CK) is broadcast as part of the control data in encrypted form. Now, the common key could be used with a given program, with different common keys associated with different programs. Thus, new common keys need to be broadcast at the rate of a few per hour. In preference, though, the key is used for a limited time period (e.g., weeks, months). The common keys are broadcast encrypted using secret keys unique to each circuit, and so are broadcast in millions of different encrypted forms (one form to each recipient). As each key is a 128 bit string, and only a few are required per month (say 10), then for 10 million subscribers, the data rate required is of the order kilobits per second. The encrypted common keys (CK) are received and provided to the input interface 43 and then to the AES decryption circuit 32 on line 49. A secret key in the secret key store 34 is retrieved and also provided to the AES decryption circuit 32 on an internal bus 35. The decryption circuit 32 then decrypts the appropriate encrypted common keys and provides these on the internal bus 33 to a common key store 36. The common key store is formed as a table with a program ID (PID) and associated common key (CK) stored associated with one another. The appropriate CK can then be selected for a related received program identified by its PID. Preferably, multiple PIDs will be associated with each CK. The use of multiple common keys in this way allows different levels of service to be provided depending on the service paid for and hence the keys provided.

It is to be noted that the only way of providing control words to the DVB unit 38 is through the decryption circuit 32, and so even if the control words were known for a given program, the circuit could not be used without knowing the common key. In any event, the control words are not exposed at any outside interface, and so it is very unlikely that they could become known. It is further noted that the only way of providing the common key to the decryption circuit 32 is to pass the encrypted common key through the decryption circuit 32 itself under control of the secret key. Thus, if the common key for a particular program became known, the circuit 30 could still not be used to decrypt the program without knowing the secret key. Even if the secret key of a given circuit were known, this would only allow that circuit to be used, but no other. The circuit is therefore very secure to hacking. The secret keys are chosen to be unique to each circuit having no discernible relationship to an address of the circuit.

Although shown as a single decryption circuit 32, two such circuits could be provided, one for CW decryption, and the other for CK decryption. Of course, more than one secret key could also be used in each circuit and such modifications are within the scope of the invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

The invention claimed is:

1. A semiconductor integrated circuit, comprising:
a monolithic circuit for decryption of encrypted broadcast signals, the monolithic circuit comprising:
an input interface structured to receive the encrypted broadcast signals, to receive broadcast encrypted common keys, and to receive encrypted broadcast control data having encrypted control signals, and an output interface for output of decrypted broadcast signals;
a processing unit arranged to receive the encrypted broadcast signals via the input interface, to decrypt the encrypted broadcast signals in accordance with decrypted control signals, and to provide decrypted broadcast signals to the output interface;
a first decryption circuit arranged to receive encrypted control signals from the input interface, to decrypt the control signals in accordance with a decrypted common key from a dedicated common key store in the integrated circuit, and to output the decrypted control signals to the processing unit, the common key store structured to store a plurality of decrypted common keys in association with a respective identifier corresponding to each broadcast signal; and
a second decryption circuit arranged to receive the common key in encrypted form from the input interface and to decrypt the common key in accordance with a secret key from a secret key store in the integrated circuit and to store the decrypted common key in the decrypted common key store, the secret key being unique to the monolithic circuit and being not accessible from outside the monolithic circuit;
the monolithic circuit structured so that the only route to placing a common key in the common key store is to receive by broadcast the common key in encrypted form for decryption in accordance with the secret key and provide the common key to the common key store over an internal bus, the common key store receiving and storing a plurality of decrypted common keys that provide different levels of access to the broadcast signals, and the only route to providing the control signals to the processing unit is to input them in encrypted form for decryption in accordance with the common key.

2. The semiconductor integrated circuit of claim 1, wherein the first decryption circuit and second decryption circuit are formed in a common circuit.

3. The semiconductor integrated circuit of to claim 1, wherein at least one of the first decryption circuit and the second decryption circuit comprises an AES circuit.

4. The semiconductor integrated circuit of claim 1, wherein the broadcast signal comprises a digital television signal and the processing unit comprises a DVB circuit.

5. The semiconductor integrated circuit of claim 1, wherein the input interface has a separate input for the encrypted common key connected to the decryption circuit.

6. The semiconductor integrated circuit of claim 1, wherein the secret key is unique to the semiconductor integrated circuit.

7. The semiconductor integrated circuit of claim 1, wherein multiple identifiers are associated with each common key.

8. A system for broadcasting signals to a plurality of subscribers in which only authorized recipients are able to decrypt the broadcast signals, the system comprising:
a transmitter arranged to broadcast:
signals encrypted according to control words;
control words encrypted according to a common key common to two or more authorized recipients; and
common keys encrypted respectively according to a unique secret key of each authorized recipient, each of the common keys associated with the respective encrypted broadcast signals with a respective identifier;
the system further comprising a plurality of receivers, each receiver comprising a semiconductor integrated circuit, wherein the secret key is unique to each semiconductor integrated circuit, the semiconductor integrated circuit comprising:
an input interface structured to receive the encrypted broadcast signals, a broadcast encrypted common keys, and broadcast control data with encrypted control signals, and an output interface for output of decrypted broadcast signals;
a processing unit structured to receive the encrypted broadcast signals via the input interface, to decrypt the encrypted broadcast signals in accordance with control signals, and to provide decrypted broadcast signals to the output interface;

a first decryption circuit arranged to receive the encrypted control signals from the input interface and to decrypt the control signals in accordance with a respective decrypted common key and identifier from a dedicated common key store in the integrated circuit that stores a plurality of decrypted common keys and associated identifiers; and a second decryption circuit arranged to receive the common keys in encrypted form from the input interface and to decrypt the common keys in accordance with a secret key from a secret key store in the integrated circuit and to store each decrypted common key in the decrypted common key store with a respective identifier;

whereby the circuit is arranged such that the only route to placing a common key in the common key store is to receive by broadcast the common key in encrypted form for decryption in accordance with the secret key and provide the common key to the common key store over an internal bus, and the only route to providing the control signals to the processing unit is to input them in encrypted form for decryption in accordance with the common key.

9. A set top decoder device for decryption of broadcast signals, comprising:

a monolithic device located in the set top box;

a common key store in the monolithic device and configured to receive a decrypted common key and a respective identifier that is associated with a respective broadcast signal;

a secret key store in the monolithic device configured to store a secret key that is unique to the monolithic device;

a decryption unit comprising a first decryption circuit configured to receive encrypted broadcast control signals and to decrypt the control signals in accordance with a respective common key from the common key store, and a second decryption circuit configured to receive the broadcast common key in encrypted form and to decrypt the common key in accordance with a secret key from the secret key store and to store the decrypted common key in the common key store with the respective identifier that associates the decrypted common key with the respective broadcast signal; and a processing unit configured to receive encrypted broadcast signals and decrypt the encrypted broadcast signals in accordance with the decrypted control signals received from the decryption unit and to provide decrypted broadcast signals to an output interface;

whereby the device is arranged such that the only route to placing a common key in the common key store is to input the common key in encrypted form for decryption in accordance with the secret key and provide the common key to the common key store over an internal bus, and the only route to providing the control signals to the processing unit is to input them in encrypted form for decryption in accordance with the common key.

10. The device of claim 9, wherein the common key store is configured to store multiple common keys.

11. The device of claim 9, wherein the decryption device is formed as a single semiconductor integrated circuit having an input interface for receipt of encrypted broadcast signals, encrypted control signals, and encrypted common keys, and an output interface for output of decrypted broadcast signals.

12. A method of decrypting encrypted broadcast signals, comprising:

receiving encrypted broadcast signals, encrypted broadcast control signals for the respective broadcast signals, and encrypted broadcast common key signals at an input interface of a decryption unit formed on a monolithic semiconductor integrated circuit, the semiconductor integrated circuit comprising a common key store, a secret key store, and a processing unit;

decrypting the encrypted broadcast common keys utilizing a stored secret key in the secret key store in the semiconductor integrated circuit to generate decrypted common keys and program identifier that associates each common key with the respective broadcast signal and that provides different levels of access to the broadcast signals through the common keys;

storing the decrypted common keys in the common key store in the semiconductor integrated circuit with the respective identifiers in a table format;

decrypting the encrypted control signals for respective broadcast signals with the respective common key to generate decrypted control signals;

providing the decrypted control signals to the processing unit; and decrypting the encrypted broadcast signals using the processing unit in accordance with the decrypted control signals and providing decrypted broadcast signals to an output interface of the decryption device;

whereby the semiconductor integrated circuit is arranged such that the only route to placing the decrypted common keys in the common key store is to receive by broadcast the common keys in encrypted form for decryption in accordance with the secret key and provide the decrypted common keys to the common key store over an internal bus, and the only route to providing the control signals to the processing unit is to input them in encrypted form for decryption in accordance with the respective common key.

13. The method of claim 12, further comprising storing a secret key that is unique to the decryption unit in the secret key store in the decryption unit.

14. The method of claim 12, further comprising changing the encrypted broadcast common keys at a rate that is in the range of more than once per hour.

15. A method for broadcasting signals to a plurality of subscribers in which only authorized recipients are able to decrypt the broadcast signals that include picture and sound components, the method comprising:

encrypting control words associated with the broadcast signals and broadcasting the encrypted control words;

encrypting common keys associated with the broadcast signals by program identifiers and broadcasting the encrypted common keys;

encrypting broadcast signals and broadcasting the encrypted broadcast signals to the plurality of subscribers;

providing a secret key to each authorized recipient that is stored in a secret key store on a monolithic semiconductor integrated circuit in a respective decryption unit;

receiving encrypted broadcast signals, encrypted broadcast control signals for the respective broadcast signals, and encrypted broadcast common key signals at an input interface of a decryption unit formed on the monolithic semiconductor integrated circuit, the semiconductor integrated circuit comprising a common key store, a secret key store, and a processing unit;

decrypting the encrypted common keys utilizing a stored secret key to generate decrypted common keys and program identifier that associates each common key with the respective broadcast signal;

storing the decrypted common keys in a dedicated common key store on the monolithic semiconductor integrated circuit with the respective identifiers in a table format;

decrypting the encrypted control signals for respective broadcast signals with the respective decrypted common key to generate decrypted control signals;

providing the decrypted control signals to the processing unit; and decrypting the encrypted broadcast signals using the processing unit in accordance with the decrypted control signals and providing decrypted broadcast signals to an output interface of the decryption device;

whereby the semiconductor integrated circuit is arranged such that the only route to placing a common key in the common keys store is to receive by broadcast the common keys in encrypted form for decryption in accordance with the secret key and provide the common keys to the common key store over an internal bus, and the only route to providing the control signals to the processing unit is to receive by broadcast them in encrypted form for decryption in accordance with the respective common key.

16. The method of claim 15, further comprising storing a secret key that is unique to the decryption unit in the secret key store in the decryption unit.

17. The method of claim 15, further comprising changing the encrypted broadcast common keys at a rate that is in the range of more than once per hour.

18. A system for broadcasting signals to a plurality of subscribers in which only authorized recipients are able to decrypt the broadcast signals that include picture and sound components, the system comprising:

a transmitter configured to broadcast signals encrypted according to control words, to broadcast control words encrypted according to a common key that is common to two or more authorized recipients, and to broadcast the common key encrypted according to a secret key that is unique to each authorized recipient, the system configured to change the encrypted common keys at a rate that is greater than once per hour; and a plurality of receivers configured to receive the broadcast signals, each receiver comprising:

a common key store formed on a single monolithic semiconductor integrated circuit and configured to receive the broadcasted common key and a respective identifier that is associated with a respective broadcast signal;

a secret key store formed on the single monolithic semiconductor integrated circuit and configured to store a secret key that is unique to the monolithic device;

a decryption unit formed on the single monolithic semiconductor integrated circuit and comprising a first decryption circuit configured to receive the broadcasted encrypted control signals and to decrypt the encrypted control signals in accordance with a respective common key from the common key store, and a second decryption circuit configured to receive the broadcasted common key in encrypted form and to decrypt the encrypted common key in accordance with a secret key from the secret key store and to store the common key in the common key store with the respective identifier that associates the decrypted common key with the respective broadcast signals; and a processing unit formed on the single monolithic semiconductor integrated circuit and configured to receive encrypted broadcast signals and decrypt the encrypted broadcast signals in accordance with the decrypted control signals received from the decryption unit and to provide decrypted broadcast signals to an output interface;

whereby the system is arranged such that the only route to placing a common key in the common key store is to receive by broadcast the common key in encrypted form for decryption in accordance with the secret key and provide the decrypted common key to the common key store over an internal bus, and the only route to providing the control signals to the processing unit is to receive them by broadcast in encrypted form for decryption in accordance with the common key.

19. The system of claim 18, wherein the decryption device is formed on the a single semiconductor integrated circuit having an input interface for receipt of encrypted broadcast signals, encrypted control signals, and encrypted common keys, and an output interface for output of decrypted broadcast signals.

20. The system of claim 8, wherein the secret key is unique to the semiconductor integrated circuit.

* * * * *